Feb. 13, 1934.  H. G. WEYMOUTH  1,947,367
REGISTERING FLUID METER
Filed Dec. 12, 1929  3 Sheets-Sheet 1
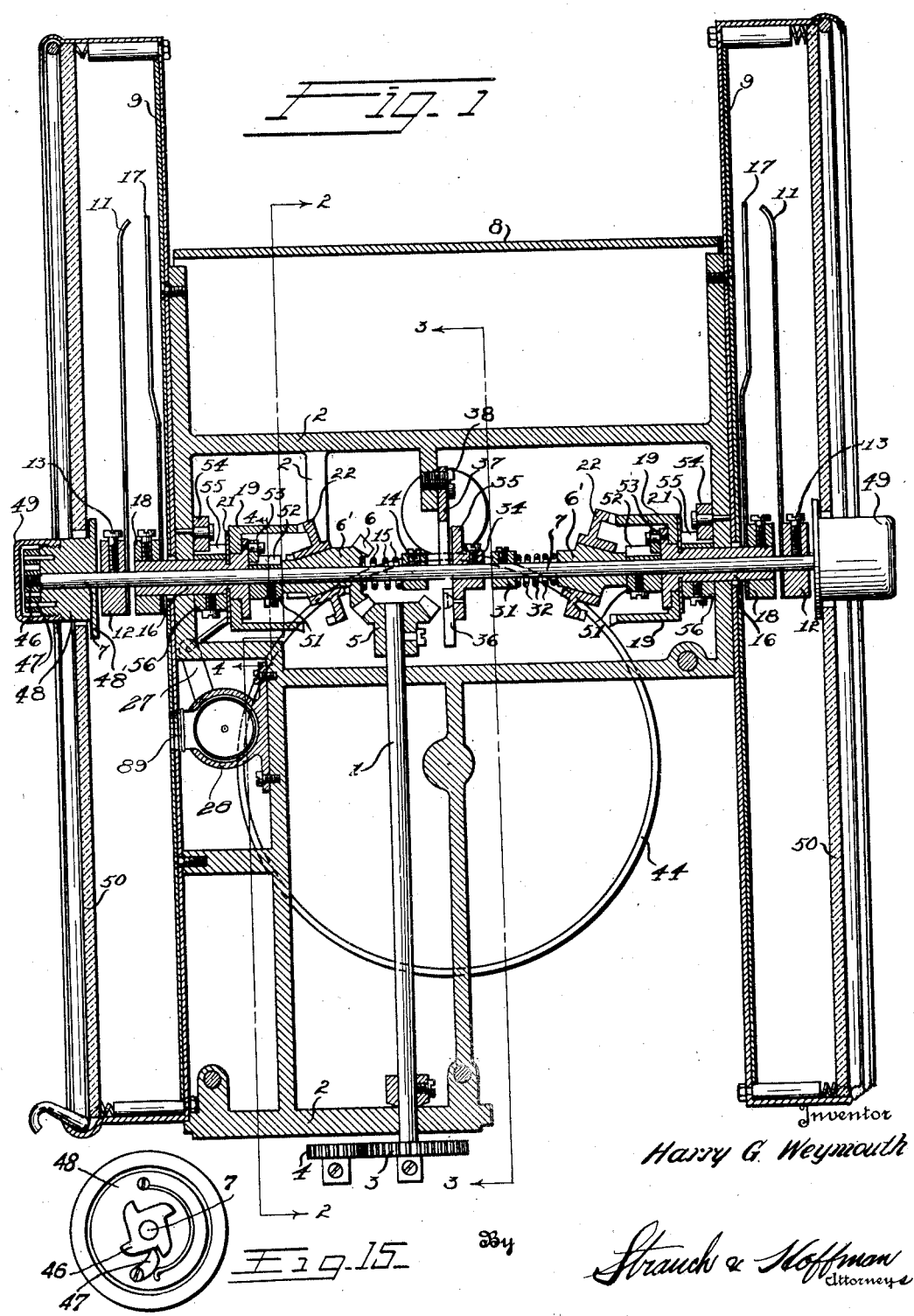
Inventor
Harry G. Weymouth
By
Strauch & Hoffman
Attorneys Feb. 13, 1934.  H. G. WEYMOUTH  1,947,367
REGISTERING FLUID METER
Filed Dec. 12, 1929  3 Sheets-Sheet 2
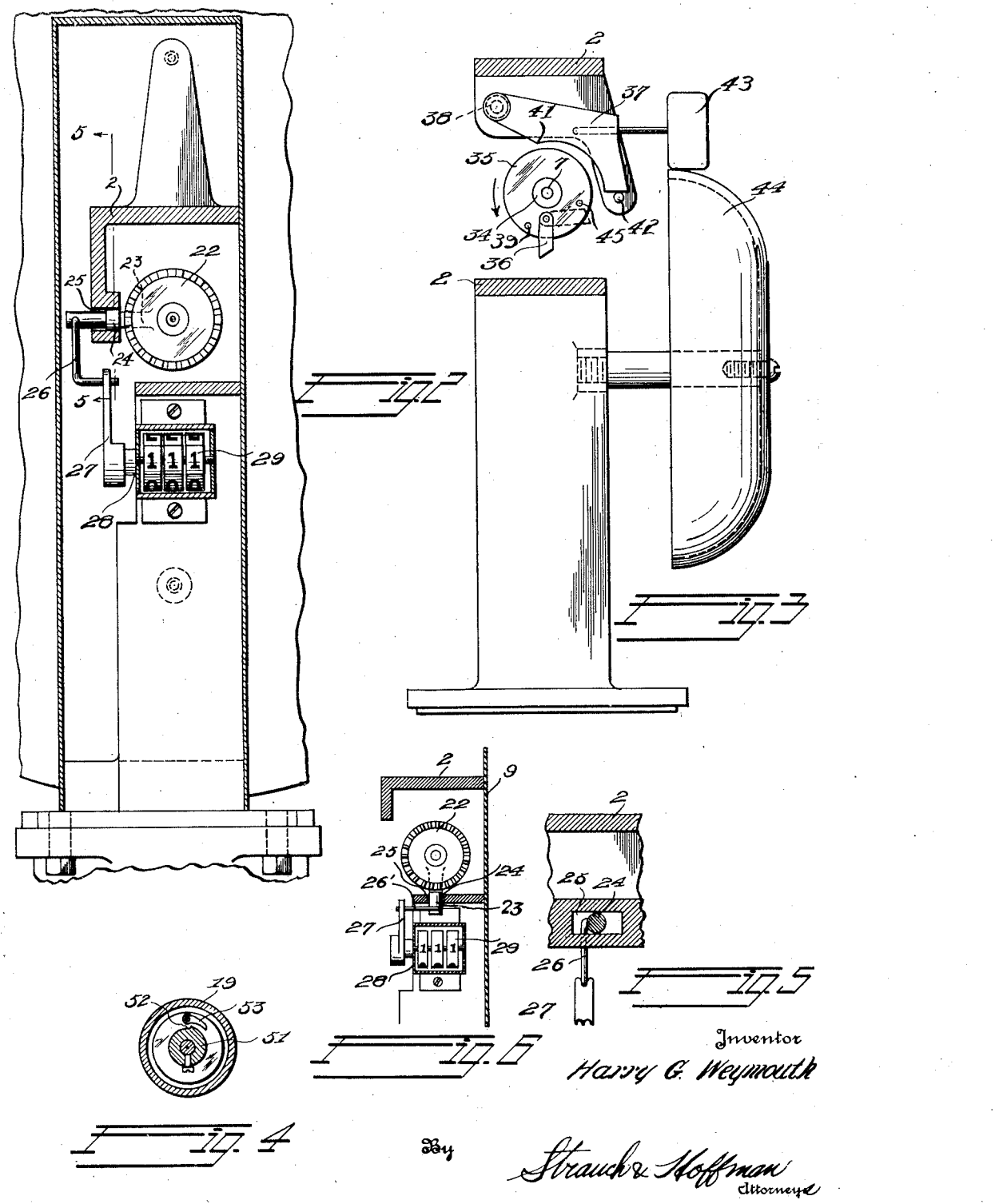

Feb. 13, 1934.    H. G. WEYMOUTH    1,947,367
REGISTERING FLUID METER
Filed Dec. 12, 1929    3 Sheets-Sheet 3
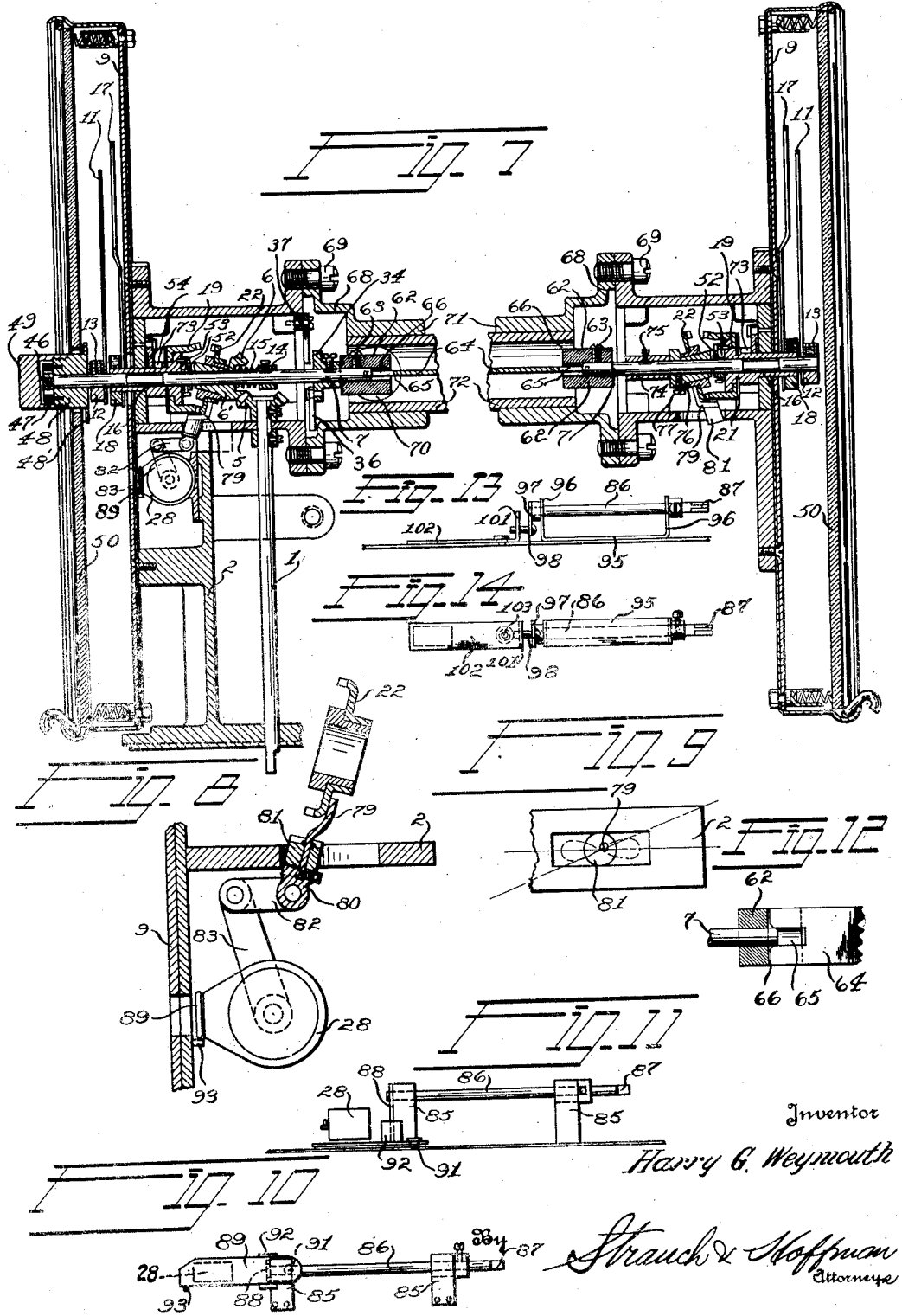
Inventor
Harry G. Weymouth
By Strauch & Hoffman
Attorneys Patented Feb. 13, 1934

1,947,367

UNITED STATES PATENT OFFICE 1,947,367

REGISTERING FLUID METER

Harry G. Weymouth, Pittsburgh, Pa., assignor to Pittsburgh Equitable Meter Company, Pittsburgh, Pa., a corporation of Pennsylvania Application December 12, 1929
Serial No. 413,602

11 Claims. (Cl. 235—94)

This invention relates to a register and counter for a fluid meter especially designed for use in connection with the dispensing of gasoline though the invention is obviously capable of various other uses.

A primary object of the invention is to provide a fluid meter having a register of simple construction for use in dispensing a fluid, the operation of which is visibly and audibly indicated so that the purchaser of the metered fluid may be advised of the quantity that is passing through the meter.

Another object of the invention is to provide a fluid meter having a plurality of visible indicators that are greatly simplified in construction, in which the parts are compactly arranged, and in which the indicators are driven from a common shaft, the movements of which are controlled by a meter.

Another object of the invention is to provide a visible fluid meter register and indicator having a plurality of synchronously moving indicating elements the operation of which is visible from opposite directions, and in which novel and simple means are provided for simultaneously returning said indicating elements to their zero positions.

Another object of this invention is to provide a novel drive mechanism of two indicating elements driven at different speeds, wherein the use of an offset shaft is avoided and the two indicators are driven by concentric shafts.

A further object of this invention is to provide a fluid registering mechanism having two shafts to be driven at different speeds, with a novel nutating gear for accurately transmitting motion from one shaft to another.

Another object of this invention is to provide a fluid register and indicator which may have one or two indicator dials with hands therefor, which may readily be changed from a single dial register to a two dial one and vice versa, and in which minor variations in spacing of the dials is compensated for in the driving mechanism.

A further object of the invention is to improve fluid registering appliances of this type by decreasing the number of parts, lessening the friction of the various parts, reducing the back-lash of the gearing, and generally to increase the efficiency of the mechanism.

A further object of the invention is to provide a novel drive mechanism between two indicator shafts driven at different speeds, including a nutating gear, with a counter means for registering rotation of one shaft, said counter being operated by the nutations of said gear.

A further object of the invention is to provide a fluid register having a counter for totalizing the quantity of fluid dispensed, with a novel shutter for normally closing the counter opening and so arranged that the authorized attendant can simply and easily expose the counter for his inspection.

These and various other objects will be apparent from the following description when taken in connection with the accompanying drawings wherein Figure 1 is a transverse sectional view of one embodiment of my improved register showing the driving mechanism.

Figure 2 is a section taken substantially on line 2—2 of Figure 1, with parts thereof in elevation.

Figure 3 is a section on line 3—3 of Figure 1.

Figure 4 is a section on line 4—4 of Figure 1.

Figure 5 is a section on line 5—5 of Figure 2, and

Figure 6 is a broken view similar to Figure 2 of a modification.

Figure 7 is another embodiment of my improved register.

Figure 8 is an enlarged sectional view of one nutating gear as shown in Figure 7.

Figure 9 is a partly diagrammatic view showing the path of movement of the arm on the nutating gear of Figure 8.

Figure 10 is a top plan of my improved shutter for normally closing the opening through which the counter is visible.

Figure 11 is a back elevation thereof.

Figure 12 is a detail section of the drive connection of Figure 7.

Figure 13 is a top plan of a modified form of shutter.

Figure 14 is a front elevation thereof with the dial face removed.

Figure 15 is an end view of the set-back device with the cap removed.

Referring to Figures 1 to 5 of the drawings, wherein is shown one embodiment of my improved register a main drive shaft 1 is vertically supported in the frame 2 of the register and has a gear 3 on the lower end thereof in engagement with a driving gear 4. Gear 4 is adapted to be driven by a fluid meter of any suitable type preferably one of the nutating disk type.

The drive shaft 1 has secured thereto adjacent its upper end a miter gear 5 engaging and driving another miter gear 6. The miter gear 6 is rotatably journalled on a cross shaft 7, which shaft is the one gallon registering and indicating shaft or the unit shaft, and projects beyond the opposite ends of the casing 8. Indicating dials 9 are secured to the frame 2 and have numerals thereon for indicating fractions of a gallon and total gallons passed through the meter. Usually dials 9 will be divided into 20 subdivisions, each division indicating one gallon, with other divisions indicating fractions of a gallon. The unit shaft 7 has a pointer 11 secured adjacent each end thereof by collars 12 secured by set screws 13. These pointers 11 are the one gallon indicators and the gears 3, 4 and 5, 6 are so chosen that pointers 11 make one complete revolution for each gallon of liquid passed by the meter.

The shaft 7 is driven by rotation of gear 6 by a friction drive, as follows. A collar 14 is secured to shaft 7 by a set screw and a coil spring 15 surrounds shaft 7 and is compressed between collar 14 and the hub 6' of driven gear 6. Gear 6 is in mesh with gear 5 mounted on drive shaft 1.

By the novel drive mechanism about to be described, the use of a countershaft for the 20 gallon pointers is avoided, two sleeves 16 being journalled for rotation on shaft 7. These sleeves constitute the totalizing shafts or sleeves, and each sleeve 16 projects beyond the dials 9 and has secured thereto the 20 gallon pointers 17, by means of collars 18 secured by set screws. Crown gears 19 are journalled on sleeves 16 and a friction drive including a buckled spring plate 21 is interposed between each crown gear 19 and its sleeve 16. Journalled on hubs 6' are nutating gears 22. It will be noted that hubs 6' have angularly disposed surfaces for the journalling of nutating gears 22. The nutating gears 22 have gear teeth thereon facing the crown gears 19, and each gear 22 has one or more teeth less than its corresponding crown gear 19. In one embodiment of my invention the nutating gears 22 have 38 teeth and the crown gears 19 have 40 teeth. This ratio causes a 20 to 1 movement, but obviously various other ratios could be used. Each nutating gear 22 is prevented from rotating with its hub.

The action of the nutating gears is as follows. As the miter gear 6 rotates, the angled portion of its hub 6' causes its nutating gear 22 to rock or nutate, since gear 22 cannot rotate. Since the number of teeth in each gear 22 differs from the number of teeth on its crown gear 19, the oscillating or rocking movement of each nutating gear 22 causes its crown gear 19 to be rotated slowly, the teeth of gear 22 camming the teeth on gear 19. Each nutating gear 22 will make one complete nutation for each revolution of gear 6 and also for each revolution of shaft 7, since shaft 7 is driven at the same speed as gear 6. By proper selection of teeth on gears 19 and 22 any relative speed may therefore be obtained between shaft 7 and sleeve 16. In the present case each totalizing sleeve 16 is caused to rotate one twentieth of a revolution for each rotation of shaft 7, whereby the twenty gallon pointers 17 secured to sleeves 16 will make one complete revolution to twenty revolutions of the one gallon pointers 11.

As seen in Figures 2 and 5, the means to prevent rotation of the nutating gears 22 comprises an arm 23 secured to said gear and projecting to the side thereof. This arm has a hub 24 thereon journalled for reciprocation and partial rotation in a slot 25 in frame 2. Since arm 23 will make one complete cycle of movement for each unit measurement of fluid, it is feasible to associate a counter or totalizing mechanism therewith, by the following means.

Passing through an opening in the outer end of arm 23 is a lever 26 connected as its lower end to an oscillating lever 27 of a counter 28 having disks 29 for indicating total gallons of liquid measured by the meter. Since the nutating disk 22 makes one complete nutation for each rotation of shaft 7, it will be seen that arm 23 will make one complete cycle of movement for each gallon of liquid measured and therefore counter 28 will actually total the gallons of liquid delivered. That is, for each complete revolution of the one gallon shaft, the arm 23 will move to end of the slot 25, then twist or partly rotate, then move to the other end of the slot, then twist in the reverse direction, and return to the starting point, and counter lever 27 will be oscillated forward and backward one cycle for each gallon of fluid.

Although only one totalizing counter 23 is shown it will be obvious that a second one could be associated with nutating gear 22 to the right of Figure 1. The gear 22 at the right side of Figure 1 will be prevented from rotation by any means, preferably by an arm similar to arm 23.

The mechanisms to the right and left sides of Figure 1 are substantially the same, the differences being as follows. It will be seen that miter gear 5 meshes only with one miter gear 6. Therefore, in order to drive hub 6' to the right of Figure 1 a friction drive connects this hub with shaft 7, this drive comprising a collar 31 secured to shaft 7 by a set screw, and a coil spring 32 interposed between hub 6' and this collar 31. Hub 6' is therefore caused to rotate with shaft 7 and the action of nutating gear 22, crown gear 19 and sleeve 16 is the same as that previously described.

In order to give an audible signal for each revolution of the gallon hands 11, a sleeve 34 is secured to shaft 7 by a set screw, said sleeve having an outstanding flange 35. Pivotally mounted on flange 35 is a dog 36 which raises arm 37 pivoted to frame 2 at 38 when rotation of shaft 7 is in the direction of the arrow in Figure 3. A stop pin 39 cooperates with dog 36 and when dog 36 passes shoulder 41 on lever 37, said lever falls by gravity and the lower end hits flange 42, thus sharply pulling bell clapper 43 downwardly to strike bell 44. The bell is thus rung for each gallon of liquid passing through the meter. When the pointers are set back to zero by mechanism to be presently described, the dog 36 rests against a second stop pin 45 and does not project out far enough to engage pivoted lever 37, so the bell is not rung when the mechanism is set back.

The novel means whereby the pointers may be manually returned to zero will now be described. The shaft 7 projects outwardly at each end beyond the casing front and since these two ends are duplicates, only one end is described. As seen at the left of Figure 1, shaft 7 has threaded thereon a ratchet wheel 46 for engagement by a pivoted dog 47 pressed against said wheel by a spring. A sleeve 48 is loosely mounted on shaft 7, the dog 47 and its spring being mounted on sleeve 48 and enclosed by a cap 49. Shaft 7 may thus be rotated by the rotation of the fluid registering meter without turning sleeve 48. Rotation of cap 49 and the shaft 7, in the reverse direction however will reset the hands to zero. Sleeve 48 has a flange 48' adjacent to the opening in the glass face 50 to prevent the insertion of wires or the like within the meter. The above resetting ratchet and knob is similar to that shown and claimed in application #352,283, H. G. Weymouth and E. M. Kreidler filed April 3, 1929.

Since the driving gears remain in mesh, the various friction clutches allow the pointers to be rotated in a reverse direction back to zero. When shaft 7 is reversely rotated the friction springs 15 and 32 slip against collars 14 and 31 so that hubs 6' do not rotate, and the one gallon hand 11 may be directly turned back to zero. In order to also turn the 20 gallon hand back to zero, collars 51 are secured to shaft 7 by set screws, these collars being preferably within crown gears 19. Each collar 51 has a notch 52 cut therein, and each 20 gallon sleeve on totalizing shaft 16 has a dog 53 pivoted thereon for engagement with the respective notches 52. Notches 52 and dogs 53 are so arranged that they do not engage when the mechanism is being driven in the registering direction, but the dogs 53 engage said notches when the pointers are being set back, snapping into the notches exactly when the one gallon hands 11 are in alignment with 20 gallon hands 17. Therefore, continued rotation of shafts 7 will carry 20 gallon sleeves 16 along with shaft 7, to thus set the 20 gallon hands 17 back to zero with the one gallon hands 11.

When the aligned hands 11 and 17 reach zero, there is provided a positive stop to prevent further reverse rotation. This stop includes dogs 54 pivoted on the frame 2 of the meter and arranged to engage notches 55 on collars 56, the collars 56 being secured to the 20 gallon sleeves 16. Thus when the hands 11 and 17 return to zero the dogs 54 prevent further rotation of sleeves 16 and since sleeves 16 are mechanically connected to shaft 7 by dogs 53 engaging in notches 52, further reverse rotation is prevented.

The operation of the mechanism above described is as follows. As the liquid passes through the meter the vertical shaft 1 rotates, carrying with it miter gears 5 and 6. By means of friction drive 15 and collar 14 shaft 7 also rotates to move one gallon hands 11 around their respective dials 9. For each revolution of shaft 7, pivoted dog 36 lifts the bell-ringing lever 41 to ring bell 44. The nutating gears 22 are caused to oscillate or rock, since these gears cannot rotate. Due to the difference in the number of teeth on nutating gears 22 and crown gears 19, these crown gears are caused to slowly rotate, carrying with them the 20 gallon sleeves 16 due to friction spring plates 21. The teeth on gears 19 and 22 are so chosen that sleeves 16 make one revolution to twenty revolutions of shaft 7, although obviously this ratio may be varied in accordance with the registering mechanism desired. For example, if a register is used wherein a ten gallon scale is used, gears 19 and 22 will be arranged to cause relative rotation of shafts 7 and 16 in a 1 to 10 ratio.

For each nutation of gear 22, the arm 23 will reciprocate in slot 25 to actuate counting mechanism 28, whereby total gallons will be registered on the counter. The hands 11 and 17 may be manually returned to zero from either side of the register by reverse rotation of either end cap 49, thus turning shaft 7 backward until the hands are in alignment, when dogs 53 snap into notches 52, so that continued rotation of end caps 49 rotates the one gallon hands and the twenty gallon hands. When the hands return to zero, dogs 54 snap into notches 55, thus preventing further reverse rotation.

Although this invention has been illustrated as having two dials with two sets of hands whereby the register may be seen from opposite sides, it will be obvious that the novel arrangement of parts may operate only one set of hands, the entire mechanism to right side of Figure 1 being omitted.

In Figure 6 a slightly modified arrangement for operating the counter 28 is shown, the arm 23 extending downwardly through slot 25 and carrying lever 26', which lever operates the counter arm 27 in the usual manner.

Attention is especially directed to the fact that all parts to the right and left side of Figure 1 are duplicates, except that one hub 6' does not have miter gear 6 thereon. By thus making the parts interchangeable, a register having only one dial may be readily changed to a two dial one and vice versa, and also the number of parts for initial installation, and repair and maintenance is greatly reduced.

In Figures 7, 8, and 9 there is illustrated another embodiment of my improved fluid register having certain features in common with the embodiment shown in Figures 1 to 5. Similar reference characters indicate corresponding parts shown in Figures 1 to 5, and a detail description of those parts common to both embodiments is believed to be unnecessary and is not repeated. The description will be given of all parts in Figures 6 to 10 which differ from those shown in Figs. 1 to 5.

As seen in Figure 7 the drive shaft 7 terminates to the right of the miter gear 6 thereon just beyond the bell ringing attachment including the hub 34 secured to said shaft, having the pivoted dog 36 for cooperation with the bell clapper 37. A sleeve 62 is secured to the end of shaft 7 by a set screw 63, said sleeve projecting beyond the end of the shaft and having a slot 66, therethrough. A flat steel strip member 64 projects into the slot 66 of sleeve 62, said member having an elongated slot 65 adjacent the end thereof. The diameter of shaft 7 and the width of slot 65 are the same and shaft 7 may therefore telescope into the slot, if necessary for adjustment. This steel member 64 is for the purpose of providing a driving connection between the right and left hand sides of the registering mechanism.

In setting up a double face meter there are usually slight inaccuracies in the frame and in the concrete or metal mounting for the register. By means of the slot 66 in the sleeve 62, these slight inaccuracies are automatically compensated for, since the right and left hand sides of the register may be moved in or out toward or away from one another without in any way detrimentally affecting the drive mechanism between the two sides of the meter. Rotation of shaft 7 and sleeve 62 is imparted to strip 64 since the end of the strip projects into slot 66 of the sleeve.

The frame 2 of the register adjacent the end of shaft 7 is adapted to receive a flanged member 68 secured to said frame by bolt 69, said member having a sleeve or nipple 71 projecting beyond the sleeve 62 on the drive shaft 7. Said sleeve 71 is adapted to receive a cylindrical pipe 72 which serves to rigidly support and separate the two registering dials of the meter and also encase the driving steel strip 64.

Each of the twenty gallon sleeves 16 of this modification has a notch 73 cut directly therein for cooperation with the pivoted dog 54, thus eliminating the use of the separate collar 56 as shown in Fig. 1. The dog 53 cooperates with notch 52 cut in sleeve 51 secured to the sleeve 16, as described in connection with Fig. 1.

The steel strip 64 may be of any suitable length and is interchangeable with other similar strips. Thus the size of the meter, or the spacing between the two registering dials may be simply and easily adjusted by interchanging the steel strip 64. The strip 64 is secured to the drive shaft 7 at the right of Fig. 7 in the same manner, similar reference characters indicating like parts. The right hand unit shaft 7 is provided with a spacing collar 74 secured by set screw 75. The nutating gear 22 is mounted on the angularly disposed hub 76 which is however, directly secured to drive shaft 7 by a set screw 77, since a friction drive at this point is not essential due to the friction drive between sleeve 16 and crown gear 19 by the buckled spring plate 21.

In this modification the means for preventing rotation of nutating gears 22 differs slightly from that shown in Fig. 1. Each nutating gear has an arm 79 projecting downwardly therefrom and passing through a slot in the frame 2 of the register. As seen more clearly in Fig. 8 a sleeve 81 surrounds the arm 79 where said arm passes through the slot, and sleeve 81 has an opening for the reception of arm 79 eccentric to said sleeve as shown in Fig. 9. The eccentric sleeve 81 is fixed to arm 79 as by brazing or welding, or the sleeve and arm may be unitary. Whether machined from one piece or assembled, the arm 79 is eccentric to sleeve 81 and is also angularly arranged with respect to the longitudinal axis of the slot, as seen by the center lines of Fig. 9. The lower end of arm 79 has a sleeve 80 held thereto by a set screw engaging in an annular slot in arm 79, so that said arm may turn and link 82 is pivoted to sleeve 80 which link is pivotally connected to link 83 connected to the counter 28. Thus as the arm 79 moves back and forth in the slot in the frame 2, the counter mechanism will be actuated in a similar manner to that described in connection with Fig. 1. The eccentric sleeve 81 is positioned about the arm 79 for the following reasons.

If the arm 79 is made to fit closely in the slot in the frame 2 and does not have the eccentric sleeve 81 thereon, this arm 79 reciprocates within said slot until it reaches the end thereof and then twists about its axis and reciprocates to the other end of the slot and then twists in the reverse direction. It has been found that such an arrangement is completely operative and is accurate but it does not give steady and even movement to the twenty gallon hand associated with the sleeve 16, since the twist of the arm 79 at the end of its reciprocating movement causes the 20 gallon hand to jump in its movement around the dial. By the provision of the eccentric sleeve 81 the path of movement of arm 79 approximates the figure 8 as shown diagrammatically in Fig. 9. The sleeve 81 reciprocates in the slot in the frame 2 and due to the tendency of the pin 79 to twist at the end of the reciprocation thereof, said pin is forced to travel in the path of an eight. By this means the movement of the twenty gallon hand is made steady and uniform throughout its rotation and there is no jump in the movement of said hand, since the twist of arm 79 is distributed throughout its reciprocatory movement. Both of the nutating gears 22 of Figures 7 have the eccentric sleeves 81 surrounding the pins 79 mounted on said gears, there being but one counting mechanism, however, associated with the arm 79, but it will be obvious that if desirable, another counting mechanism may be associated with the arm 79 shown to the right of Figure 7.

As shown in Figures 10 and 11 a novel form of shutter mechanism is associated with the counter for registering total gallons. In the dispensing of gasoline, for example, it is desirable that some form of shutter mechanism be provided in front of the counter whereby the general public, or those unauthorized to do so cannot see the counter mechanism which indicates the total gallons dispensed. However, it is desirable that this shutter be so arranged that it can simply and easily be moved out of position by the authorized attendant.

As seen in Figures 10 and 11 the shutter mechanism is supported from two duplicate brackets 85 supported on the rear face of the front of the register, said brackets having journaled in openings therein, a rotatable bar 86 having a squared end 87 thereon projecting beyond the casing of the register. The bar 86 has secured to its inner end a lever 88 which acts to lift the shutter when the rod 86 is rotated. The shutter proper comprises a flat member 89 pivoted at 91 to the rear face of the front of the register, said shutter having rearwardly projecting ears 92 thereon. The lever 88 projects between and loosely fits between the rearwardly extending ears 92, so that oscillation of lever 88 by bar 86 will engage one ear 92 to pivot the shutter 89 about pivot 91. The shutter 89 projects forwardly beyond the pivot 91 to a point such that it blocks the opening in the dial 9 and the front of the register when it is in substantially horizontal position. A stop pin 93 is provided on the register face against which the shutter 89 rests when in its horizontal position.

By this means it will be seen that the openings through which the counter mechanisms are viewed are normally closed by the shutter 89. When an authorized attendant wishes to see the totalizing register or counter, he can merely place a proper wrench or key, such as a clock key, over the squared end 87 of shaft 86 and rotate said shaft 86. Rotation of this shaft causes the lever 88 thereon to turn with shaft 86, this lever 88 lifting against the upper ear 92 of the shutter 89 to rotate said shutter about pivot 91, thus exposing the counter to view. When pressure on the key for operating the shutter is released, gravity will return the shutter 89 to position shown in Fig. 10 wherein it rests against the stop pin 93. The shutter mechanism as just disclosed is simple to manufacture and easy to install and normally closes the opening which exposes the counter mechanism and is so arranged that unauthorized operation thereof is prevented except by the use of a proper sized key or wrench. The improved shutter mechanism as above described is adapted to be associated with the type of register shown in Figures 1, to 5 or in that shown in 7 to 9, or any other fluid register.

The operation of the register shown in Fig. 7 is quite similar to that shown in Fig. 1. In the initial installation of the register, the mechanism shown in Fig. 7 is so arranged that the register can have either one or two indicating dials with the hands therefor. If only one dial is to be used, the collar 62 on the end of drive shaft 7 is removed and the flat steel strip 64 is not used. A flanged member similar to member 68 is then bolted against the frame 2, said member however having a closed end instead of a sleeve 71 as shown. The register as thus installed is completely operative as a single face register. If it is desired to later change a single face register to a double face one, it is merely necessary to remove the end plate above described from the frame 2, substitute the flanged member 68 held by bolts 69, replace sleeve 62 on drive shaft 7, and associate the steel strip 64 therewith by means of the slot 66. The space between the two meter dials is readily adjustable by varying the length of the steel strip 64 and the enclosing pipe 72. Since the parts for both ends of the meter are practically all duplicates, it is unnecessary to provide special parts for the double face meters, since one set of parts may be used for either a single face or a double face meter.

An opening 70 is provided in sleeve 71 and pipe 72 through which a screw driver may be inserted to hold or to release collar 62 held by set screw 63, whereby the parts may readily be assembled or disassembled.

When the meter register has been installed rotation of shaft 1 drives miter gear 5 connected therewith which meshes with miter gear 6 on the hub 6' to drive the main drive shaft 7 by means of the friction drive including spring 15 and the collar 14. The one gallon hand 11 is therefore rotated, making one complete revolution for each gallon of fluid dispensed. Due to the angular disposition of the hub 6', the nutating gear 22 oscillates the teeth thereof being in engagement with the crown gear 19, gear 22 being prevented from rotating by the arm 79 thereon which projects into the slot in the frame 2. The twenty gallon hand 17 which is mounted on sleeve 16 is therefore caused to rotate making one complete revolution for each twenty gallons of fluid dispensed.

Due to the arm on nutating gear 22 having the eccentric sleeve 81 mounted thereon, the movement of the twenty gallon sleeve 16 is regular and even in its motion, since the arm 79 is constrained to move in the path of a figure 8 as seen more particularly in figure 9. The counter mechanism 28 is actuated for each gallon of fluid dispensed by the movement of arm 79 with nutating gear 22.

If a double face meter is used, the rotation of shaft 7 is transmitted to the strip 64 by sleeve 62 and slot 66 therein, the slot in strip 64 allowing a slight universal movement. Minor variations in the width of the meter may be automatically compensated for by the slot 65 and the slot 66. The unit gallon drive shaft 7 to the right of Figure 7 causes hub 76 to rotate, since the hub is secured to the shaft by set screw 77. The nutating gear at this side of the meter is therefore caused to nutate due to the angular portion of hub 76, and this gear meshes with crown gear 19 in a similar manner to that as described.

When the hands of the meter are to be set back to zero after a dispensing operation, the knob or sleeve 49 is rotated in a reverse direction. Due to the pawl 46 and the pivoted dog 47 the shaft 7 to the left of Fig. 7 is caused to rotate in a reverse direction thus turning the unit gallon 11 back toward zero position. When hands 11 and 17 are in alignment the dog 53 snaps into engagement with shoulder 52 on sleeve 51, such that continued rotation of shaft 7 carries twenty gallon sleeve 16 with the same. The friction drive including spring 15 allows rotation of shaft 7 without rotation of miter gears 6 and 5, the buckled spring plate 21 allowing sleeve 16 to rotate without turning gear 19. When the two hands 11 and 17 reach the zero position the dog 54 snaps into shoulder 73 on sleeve 16 to prevent further rotation in a reverse direction.

As regards the mechanism shown to the right of Fig. 7 the unit gallon shaft 7 is rotated to turn the unit gallon hand, and since the nutating gear 22 is journaled on hub 76 which is fixed to shaft 7, said nutating gear is caused to oscillate to thus slowly carry the twenty gallon hand 17 in a reverse direction. When the hands 17 and 11 align dog 53 falls into engagement with hub 52 so that further reverse rotation of the shaft 7 then carries sleeve 16. The friction drive provided by the buckled steel spring 21 then slips on the sleeve 16 and shaft 7 and sleeve 16 rotate in a reverse direction at the same speed until the zero position is reached when the previously described zero stop operates to prevent further rotation.

Another form of shutter is shown in Figs. 13 and 14 wherein the rotary shaft 86 having squared end 87 is mounted in a bracket 95 having outwardly bent ends 96 for shaft 86. The end of shaft 86 has an arm 97 thereon carrying a pin or rivet 98 for engagement through the bent over end 101 of shutter 102. Shutter 102 is pivoted at 103 to the dial face.

Rotation of shaft 86 by a wrench or clock key engaged over end 87 will lift shutter 102 about its pivot 103 in a similar manner to the shutter shown in Figs. 10 and 11.

When an operator wishes to inspect the totalizing counter it is merely necessary to slip the proper sized wrench or key over the end of shaft 86 of either form of shutter mechanism and turn the same to thus lift the shutter away from the counter mechanism.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. In a fluid register having a main drive shaft adapted to be rotated by a meter, a unit shaft, a friction drive between said shafts, the combination of a nutating gear journalled on said unit shaft and oscillated by rotation thereof, a totalizing sleeve journalled on said unit shaft, a driving connection between said sleeve and said nutating gear including a friction drive, and means for positively connecting said unit shaft and said sleeve for reverse rotation thereof.

2. In a fluid register, having a main drive shaft adapted to be rotated by a meter, a unit shaft, a gear secured to said drive shaft, the combination of a second gear meshed with said first gear and journalled on said unit shaft, a friction drive between said second gear and the unit shaft, said second gear having an extended hub whose external surface is angularly disposed with relation to said unit shaft, a nutating gear journalled on said extended hub, a member driven by said nutating gear at different speed than that of said unit shaft, and indicators actuated by said unit shaft and said driven member.

3. In a fluid metering indicator, a unit drive shaft carrying a pointer, an angularly disposed hub mounted on and normally rotatable with said shaft, a nutating gear journalled on said hub, a sleeve journalled on said drive shaft and carrying a pointer, a second gear journalled on said sleeve and engaged with said nutating gear, and a friction drive between said second gear and said sleeve.

4. In a fluid register comprising a drive shaft, a dial, a pair of hands moving over said dial, a driven shaft carrying one of said hands, a sleeve surrounding said shaft and carrying the other of said hands, and gears connecting said drive and driven shaft; mechanism interconnecting said driven shaft and sleeve for rotation of the latter at a speed differing from the speed of rotation of said driven shaft, said mechanism comprising a gear and a nutating non-rotatably mounted element carried by said sleeve and driven shaft respectively, said gear and element being interconnected so that the nutation of said element rotates said gear.

5. In combination with the mechanism defined in claim 4, a totalizing counter, and means connected between said nutating element and said counter to utilize the nutations of the former for actuating the latter.

6. In a register of the class described, having a supporting bracket, a main shaft adapted to be driven by a meter, a unit shaft carrying a pointer, a totalizing sleeve concentrically arranged on said unit shaft and carrying a pointer, the combination of interengaging elements mounted on said sleeve and unit shaft respectively and all surrounding the latter for rotating said sleeve by said unit shaft at reduced speed, a friction drive between one of said elements and the unit shaft and a friction drive between another of said elements and the sleeve.

7. In a register of the class described, having a unit registering shaft, a totalizing shaft, said shafts being rotatable about a common axis, and means to drive said unit shaft, the combination of a nutating gear oscillated by rotation of said unit shaft, and a gear on said totalizing shaft engaging said nutating gear and rotating the totalizing shaft at reduced speed.

8. The invention as defined in claim 7 wherein said nutating gear has an outwardly extending arm, means causing said arm to be reciprocated by nutations of said gear, and counting means mounted adjacent said arm, said counting means having a crank connected to said arm for actuation in response to reciprocation of the latter.

9. In a register of the class described, having a unit shaft adapted to be driven by a liquid meter, a pair of indicator hands adapted to rotate about said shaft as an axis, one hand being fixed to said shaft, and a sleeve journalled on said shaft carrying the other hand, the combination of a crown gear journalled on said sleeve, a constantly engaged friction drive connecting said crown gear and sleeve, and a nutating gear oscillated by said unit shaft and having teeth engaging said crown gear to drive said sleeve at a reduced speed.

10. In a register of the class described, having a drive shaft adapted to be rotated by a meter, a unit shaft, and a gear secured to said drive shaft, the combination of a gear frictionally connected to said unit shaft and engaging the gear on said drive shaft, said last named gear having a cylindrical hub forming an angle with said unit shaft, a nutating gear journalled on said hub, and indicating mechanism actuated by nutations of said nutating gear.

11. The invention as defined in claim 10 wherein said indicating mechanism includes a totalizing sleeve journalled on said unit shaft, a gear meshing with said nutating gear and driven by nutations thereof, and a friction drive between said last-named gear and said sleeve.

HARRY G. WEYMOUTH.